(12) United States Patent
Yakoub

(10) Patent No.: US 9,021,751 B2
(45) Date of Patent: May 5, 2015

(54) FRICTIONAL NON ROCKING DAMPED BASE ISOLATION SYSTEM TO MITIGATE EARTHQUAKE EFFECTS ON STRUCTURES

(76) Inventor: Haisam Yakoub, Ottawa (CA)

( * ) Notice: Subject to any disclaimer, the term of this patent is extended or adjusted under 35 U.S.C. 154(b) by 514 days.

(21) Appl. No.: 13/374,653

(22) Filed: Jul. 12, 2010

(65) Prior Publication Data

US 2012/0174500 A1    Jul. 12, 2012

(30) Foreign Application Priority Data

Jul. 15, 2009    (CA) .................................... 2672314

(51) Int. Cl.
| | | |
|---|---|---|
| E04B 1/98 | (2006.01) | |
| E04H 9/02 | (2006.01) | |
| F16F 7/08 | (2006.01) | |
| F16F 15/02 | (2006.01) | |

(52) U.S. Cl.
CPC ........ *E04H 9/023* (2013.01); *F16F 7/08* (2013.01); *F16F 15/022* (2013.01); *F16F 2230/14* (2013.01); *E04B 1/98* (2013.01)

(58) Field of Classification Search
USPC .......... 52/167.1, 167.4–167.9, 74.3; 248/568, 248/618, 619, 622
See application file for complete search history.

(56) References Cited

U.S. PATENT DOCUMENTS

| | | | | |
|---|---|---|---|---|
| 4,402,483 A | * | 9/1983 | Kurabayashi et al. ........ | 248/636 |
| 4,517,778 A | * | 5/1985 | Nicolai ......................... | 52/167.5 |
| 4,565,039 A | * | 1/1986 | Oguro et al. ................. | 52/167.4 |
| 5,261,200 A | * | 11/1993 | Sasaki et al. ................. | 52/167.5 |
| 6,126,136 A | * | 10/2000 | Yen et al. ..................... | 248/560 |
| 8,011,142 B2 | * | 9/2011 | Marioni ........................ | 52/167.4 |
| 2004/0074163 A1 | * | 4/2004 | Tsai ............................. | 52/167.5 |
| 2006/0174555 A1 | * | 8/2006 | Zayas et al. .................. | 52/167.4 |
| 2008/0098671 A1 | * | 5/2008 | Tsai ............................. | 52/167.6 |
| 2008/0120927 A1 | * | 5/2008 | Tsai ............................. | 52/167.4 |

* cited by examiner

*Primary Examiner* — William Gilbert

(57) ABSTRACT

The system described herein consists of an isolator and a damping device. The isolator and damping device are used to isolate structures and thus to mitigate earthquake effects on structures. These devices extremely reduce transmitted energy to an isolated superstructure, so that protected structures by means of the devices described herein, may have small or no damages. The isolator has a spherical base fixed to ground via a footing, middle part that responds to the moving base by rotating around the center of a small concave or convex, causing the superstructure to move upwards and downwards vertically, and a top part connected to a superstructure.

The damping device consists of a base receives vertical displacement from the superstructure, dampers and springs to dissipate more energy, restrict maximum horizontal displacements and might help returning the superstructure to its stationary position in smooth way. The combination of high reduction in seismic induced forces, extreme reduction or elimination of superstructure rocking and somewhat high independency from ground motions characteristics, structure responses and isolators frequencies, become achievable with these devices described herein. Consequently, structures designed for wind loads and isolated with the devices herein may be protected to adequate amounts that allow minimal or no damages to the superstructures. That means continuous serviceability during and aftermath becomes achievable for the very most of the earthquakes and site characteristics combinations.

7 Claims, 5 Drawing Sheets

Section in the Mary Grace Damping Device, First Configuration

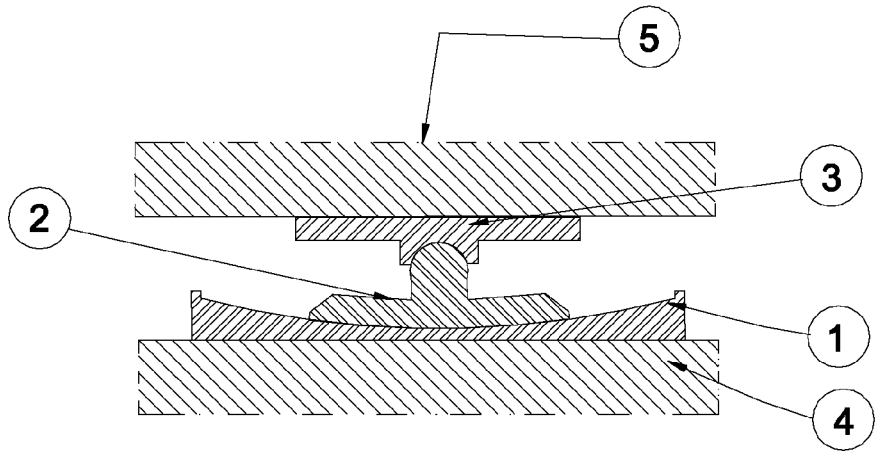
Figure 1A- Section in Mary Grace Base Isolator, First Configuration, Medium Part One Vertical Radius
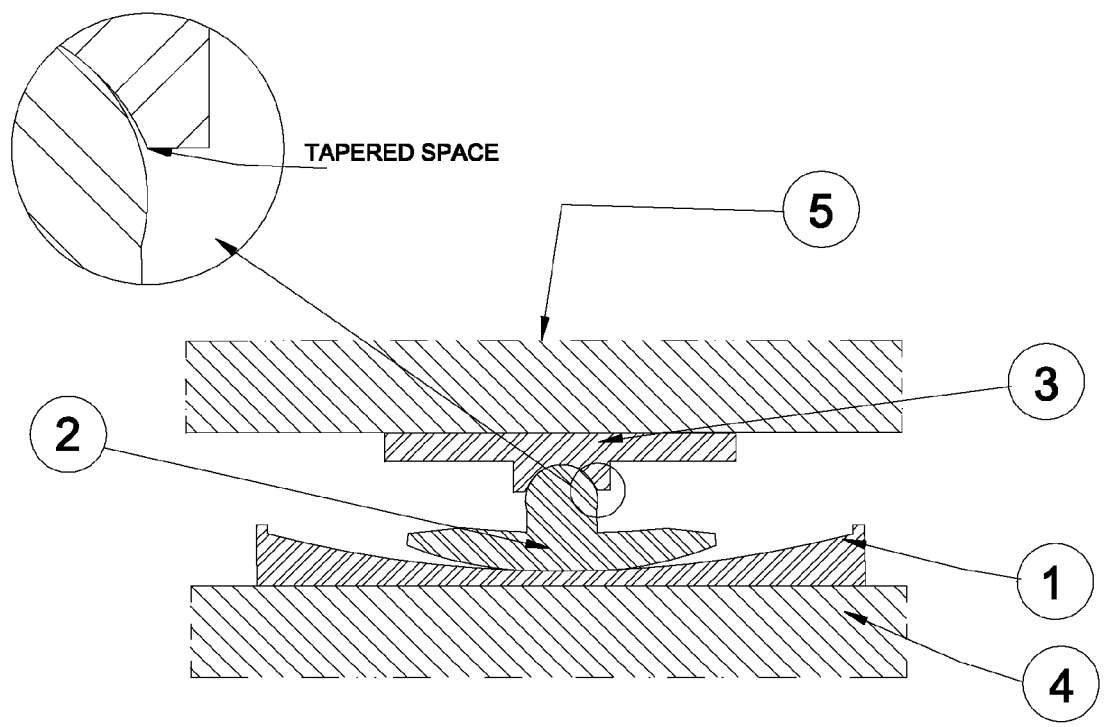
Figure 1B- Section of Mary Grace Base Isolator, First Configuration, the Medium Part Two Vertical Radii

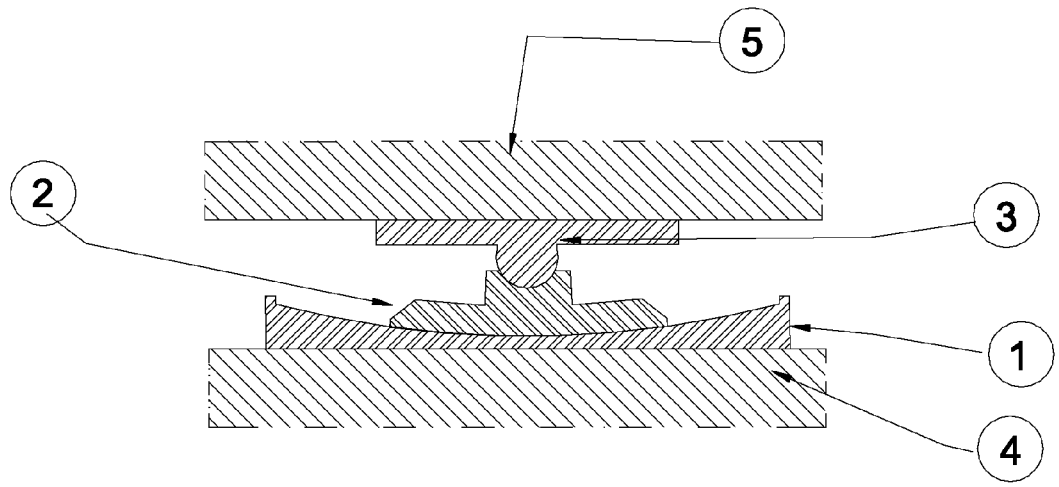
Figure 2A- Section of Mary Grace Base Isolator, Second Configuration
the Medium Part One Vertical Radius
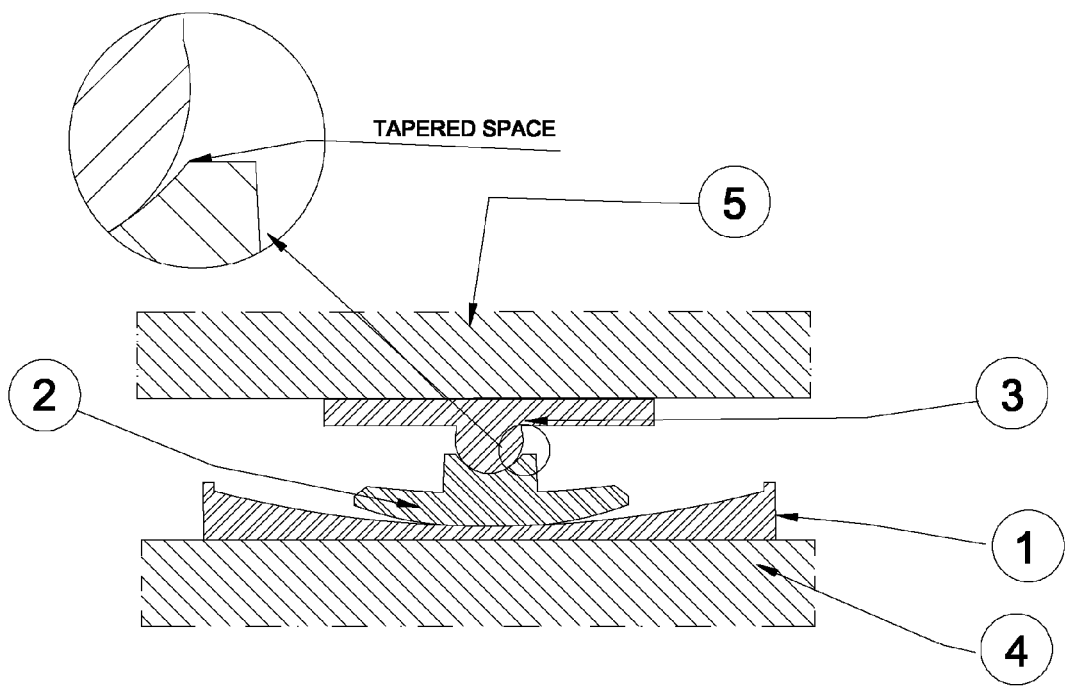
Figure 2B- Section of Mary Grace Base Isolator, Second Configuration
the Medium Part Two Vertical Radii

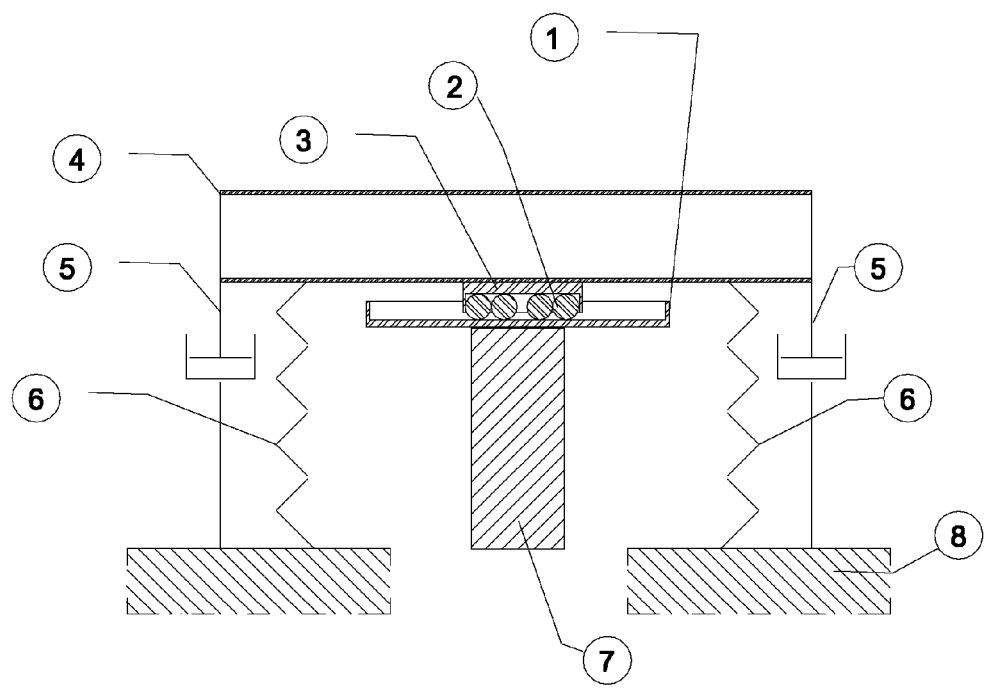
Figure 3- Section in the Mary Grace Damping Device, First Configuration

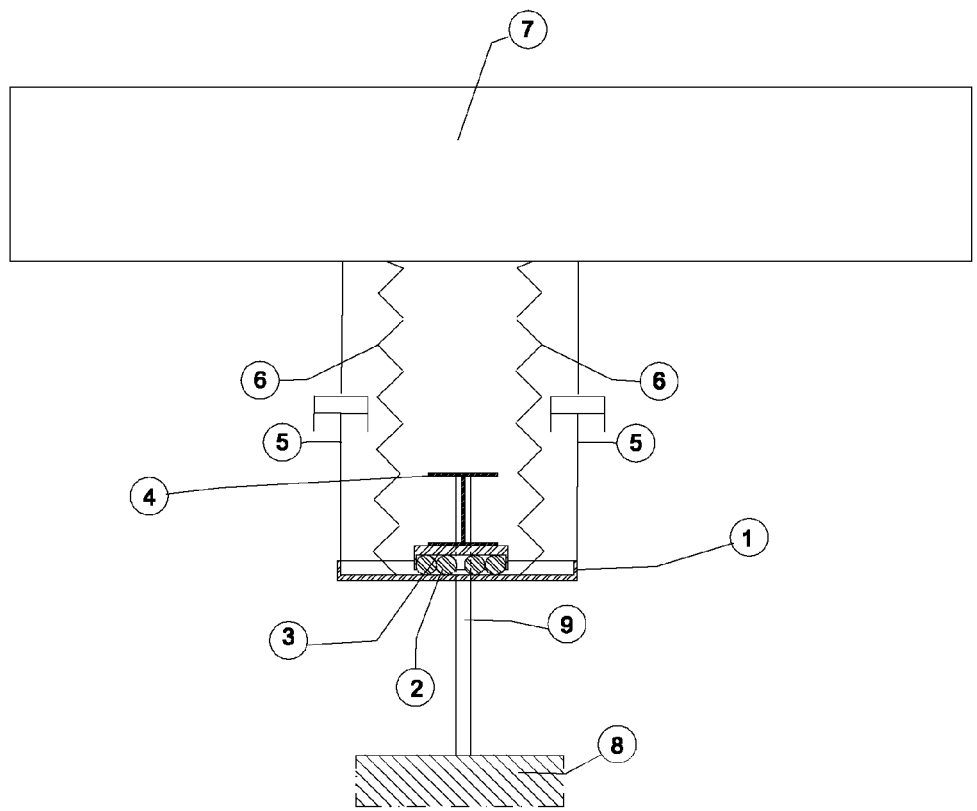
Figure 4-
Section1 in the Mary Grace Damping Device, Second Configuration

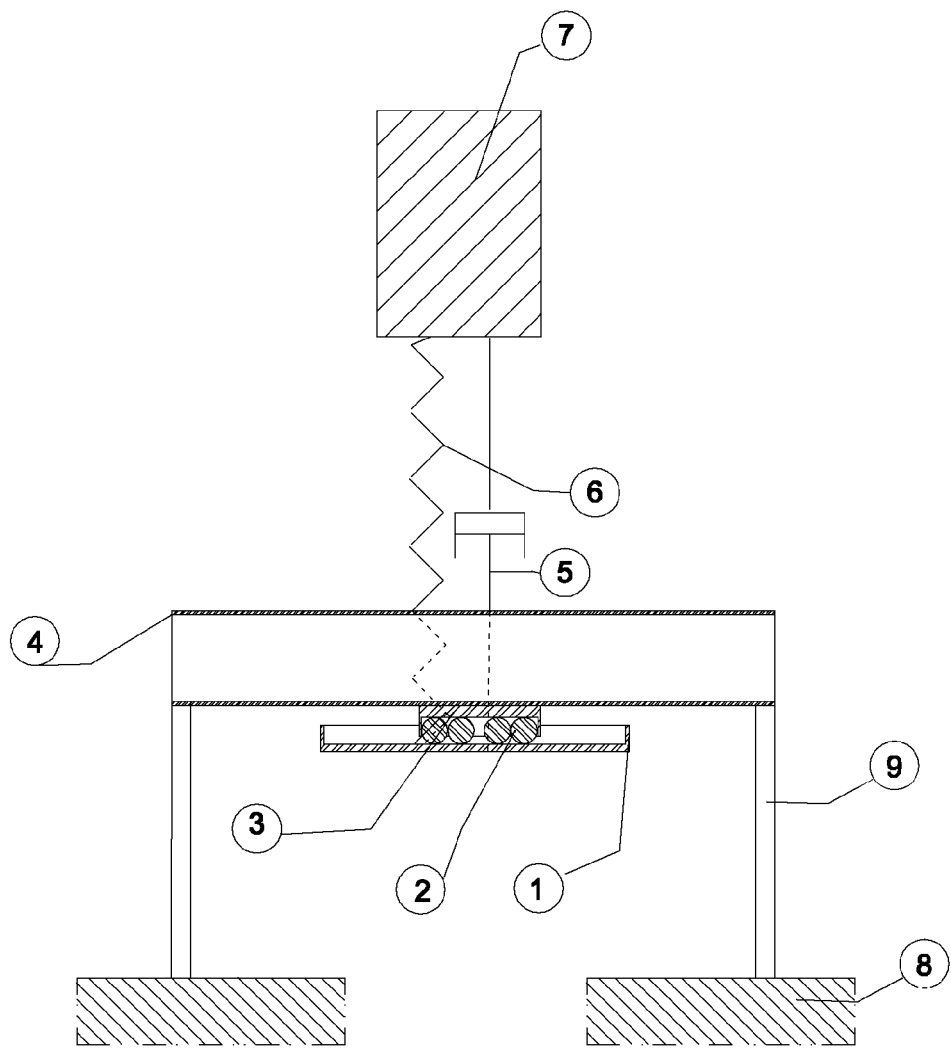
Figure 5-Section2 Perpendicular to Section1
in the Mary Grace Damping Device, Second Configuration

FRICTIONAL NON ROCKING DAMPED BASE ISOLATION SYSTEM TO MITIGATE EARTHQUAKE EFFECTS ON STRUCTURES

TECHNICAL FIELD: CIVIL ENGINEERING, STRUCTURAL ENGINEERING, EARTHQUAKE ENGINEERING

Background

The system is a part of the devices that intended to protect structures from earthquake effects some of these devices attenuate the imparted forces to the superstructures. Other devices minimize the forces to be imparted to the superstructures and thus they are called seismic isolators. The system described herein is a part of the both types of seismic protecting devices where it protects structures from earthquake effects by isolating the structures and minimizing the transmitted forces via the Mary Grace Seismic Isolator and attenuates further the remaining transmitted forces by means of the Mary Grace Damping Devices.

Friction Pendulum System or FPS is the most relevant device to the isolator described herein, while there is no counterpart to the Damping device, although some parts thereof are common, such as the viscous dampers and springs. However, the isolator described herein, has different middle part and functions very different from that of the FPS. Where, the isolator described herein:

1—The isolator described herein doesn't rock while the FPS does rock.
2—Highly reduces horizontal displacement seismic responses of the superstructures due to its middle part shape and allowable extreme smoothness of the contacting surfaces.
3—Unlike FPS, the Mary Grace Isolator horizontal response is independent from earthquake frequency where it prevents superstructure horizontal rocking. This rocking becomes dangerous in case of resonance between the FPS and ground motion frequencies,
4—Prevents superstructures from moving when subjected to wind loads while this is not the case in the FPS.
5—Allows high isolation efficiency by allowing extremely low friction factors of the contacted surfaces, where this is not the case in the FPS because the friction reduction is limited by wind loads forces that can move the superstructures over the FPS base.
6—Furthermore, FPS causes high stresses on the contact surfaces with the concaves, that causes maintenance problems, while contact stresses in the Mary Grace isolator are much less. As a result, maintenance process becomes less demanding.

Then, the isolator described herein is to be used effectively for very strong and different frequency earthquakes, transferring much less forces and displacements to the superstructure in comparison with FPS, including resonance cases.

Additional dissipation of energy is provided by the damping device that can have a viscous damper, or other types of dampers. This dissipation helps to further reduce transmitted energy to superstructures because of the special design of the damping device connections that provide for such damping of transmitted energy.

The system described herein can be fabricated with contacted surfaces have as low friction coefficients as can be generated by Tribology industry of solid lubricants. This ability provides for transmitted seismic forces to superstructures to be small enough and for wind forces to be the dominant forces in structural designs that are, in most of the cases and codes, much less demanding and less stringent.

Lastly, because of low transmitted forces, displacements and then drifts and interstory forces, structure continuous serviceability can be assured in most of the isolated structures by providing flexible connections with the main sanitary and water pipes and securing complete separation between ground and the superstructures but the flexible connections and the system described herein. Minimal or no damages to claddings and other non structural elements is expected in superstructures isolated by the Mary Grace System described herein.

SUMMARY OF INVENTION

Invention in the Isolator:
As described in the comparison between the FPS and the Mary Grace Isolator, the innovative parts in the Mary Grace Base Isolator are the middle parts that function differently from that of the FPS. Where, the isolator described herein:

1—Doesn't move with the wind forces. This wind resistance allows using contacting surfaces with the lowest possible friction factors that might reach 0.01 or less. Then the transmitted forces would be much less than that transmitted with the FPS, and a very small fraction of the earthquake forces.
2—Earthquake frequency and site characteristics don't affect much the performance of the isolator and then the transmitted forces to the superstructures. That because the isolator described herein doesn't rock.
3—Greater contact surfaces between the convexes and concaves make the functional stresses much less and maintenance process becomes less demanding.
4—The movement of the superstructures are up and down instead from side to side that because the ability of the middle part to rotate around the center of the small concave-convex connection that is different from the center of the base concave.

Invention in the Damping Device:
1—Mary Grace Damping device can damp seismic forces without inducing more significant forces into the isolated superstructures. That is possible because of the innovative connection between the superstructure and ground. The special connection of steel balls and two containers allows to attenuate seismic forces further before affecting the whole structure as it connect one isolated object (superstructure) to an external object (ground). As a matter of fact the balls transmit only the vertical forces, while horizontal seismic forces range from 0.001-0.005 of the spring vertical forces. The lowest number can be reached by providing very smooth surfaces contact the steel balls and by making the steel balls themselves very smooth. Furthermore, the induced horizontal forces can be reduced further by sloping the dampers while the horizontal displacements can be reduced by sloping the springs.
2—The application ability of viscous damping, using the Mary Grace Damping devices, to the isolated structures, by means of FPS, allows to avoid resonance impacts on the superstructures, where incorporating viscous dampers into the isolated structures internal damping) doesn't improve the situation and attenuate the vibration, that because of the vibration amplitude reaches infinity in the resonance vicinity. On the other hand adding external dampers without the special connection of the balls increase significantly the induced seismic forces to the superstructures.

Functions of the Embodiments:

The Mary Grace Base isolator or briefly isolator is used to isolate buildings, bridges, silos, factories and other structures, being made from concrete, steel, wood or other materials, from earthquake effects when are susceptible to earthquakes, so that it protects these isolated structures, from being highly damaged or failed, by means of reducing transmitted forces to superstructures and displacements thereof.

The isolators are installed under structure foundations, footings or columns (see FIGS. 1A, 1B, 2A and 2B) one isolator under each column, foundation or footing. The upper part of the isolator is fixed to a superstructure and the bottom part is fixed to a ground footing spread the weight of foundation into ground. Ground footings become a source of earthquake forces and displacements during an event. Nevertheless, the foundations or columns on the upper side, and therefore the superstructure, receive much smaller forces and displacements from the isolator. There must be no rigid connections between the superstructure and ground other than the isolators and may be the Mary Grace damping device, if used, in order to ensure the highest possible level of protection.

An isolator can work alone or in combination with a damping device described herein. When an earthquake hits an isolated structure, the superstructure moves slightly up and down. The magnitude and frequency of the vertical movements depends on the design earthquake characteristics and the isolator's dimensions, geometry and materials.

Mary Grace Base Isolator Description:

A Mary Grace Isolator or briefly an isolator consists of three main parts:

1. Base: it is the first part, 1, in FIGS. 1A, 1B, 2A and 2B. A base has one flat side connected to a ground footing that is the fifth part, 5, in 1A, 1B, 2A and 2B, while the other side is spherical part (concave) has two radii, vertical radius $R_v$ and horizontal $R_h$, that are calculated from the requirements for self returning to the stationary position at the lowest point of the base, and from the largest displacements expected in a region for the most credible design earthquake respectively. The concave surface must have the lowest possible friction coefficient so it induces smallest possible forces to the isolated superstructures.

2. Middle part: it is the second part, 2, in FIGS. 1A, 1B, 2A and 2B. This part offers two main advantages that make the isolator unique in the whole world. First special advantage is that it provides for non rocking response of the superstructure. Instead, the superstructure moves vertically because of the middle part rotation around the centre of small convex-concave joint that connects the middle part to the upper part of the isolator. Another very especial characteristic is that it prevents the superstructure from moving by wind forces no matter how smooth are the contacted surfaces of the base and the middle part of the isolator. See FIGS. 1A, 1B, 2A and 2B). The middle part contacts the isolator base via its bottom smooth, low friction spherical disk surface. This surface has the same vertical radius as that of the isolator base for the whole surface (See FIGS. 1A and 2A) or part of it as in FIGS. 1B and 2B where the Middle part bottom surface has the vertical radius in its center part and different smaller vertical radius for the surrounding parts.

3. Top part: it is the third part, 3, in FIGS. 1A, 1B, 2A and 2B. This part has bottom side that fits the middle part top part. This part has an upper side that is flat and fixed to a superstructure that is the fourth part, 4, in the FIGS. 1A, 1B, 2A and 2B.

Mary Grace Damping Device Function:

When Mary Grace Damping Device works in combination with Mary Grace Isolators, it further attenuates movements of the superstructure by means of its springs and dampers. Dampers absorb energy to soften the superstructure vibrations, while springs store strain energy and helps restricting further horizontal displacements and helps returning the system to its stationary point aftermath.

When a Mary Grace Damping Device works with a Friction Pendulum System isolator (FPS), it highly attenuates the resonant response in case of FPS and Earthquake frequencies are close. In addition, Mary Grace Damping Device reduces both vertical and horizontal displacements of a superstructure isolated by FPS devices.

BRIEF DESCRIPTION OF THE DRAWINGS

FIG. 1A: a first configuration of the isolator.
FIG. 1B: a second configuration of the isolator.
FIG. 2A: a third configuration of the isolator.
FIG. 2B: a fourth configuration of the isolator.
FIG. 3: a first configuration of the damping device.
FIG. 4: a second configuration of the damping device.
FIG. 5: a third configuration of the damping device.

MARY GRACE DAMPING DEVICE DESCRIPTION

The Mary Grace Damping Device consists of five main parts, See FIGS. 3, 4 and 5:

1. Base, that is the first part, 1, in FIGS. 3, 4, and 5. It is a flat disk with constant height perimeter wall. A Base looks like a short barrel with no cover. The Base is attached to a superstructure (Part 7) via dampers and springs, parts 5 and 6 in FIGS. 4 and 5. The Base can be fixed from bottom directly to superstructure as in FIG. 3, or via dampers and springs as in FIGS. 4 and 5, Mary Grace Damping Device Base contains steel balls that are restrained in their ultimate movements by the Base perimeter. Consequently, the Base horizontal radius must be great enough to prevent any potential crushing between the cover and the Base. The base radius can be calculated from the maximum displacement of all earthquakes in a considered region.

2. Cover, is the third part, 3, in FIGS. 3, 4 and 5. It is similar in shape but smaller than the base, and placed upside down. The cover contacts steel balls from bottom and is connected indirectly to ground from the top via steel beam (part, 4, in the FIGS. 3, 4 and 5) and two steel columns (part 9) as in FIGS. 4 and 5. The Cover can be connected to ground via a steel beam, dampers (part, 5,) and springs (part, 6,) as in the FIG. 3. However, the last connection it's not the preferable connection.

3. Middle Part (3), in FIGS. 3, 4 and 5 consists of steel balls transfer mainly vertical displacements from superstructure to dampers and springs via the Base, balls and Beam as in FIG. 3, or directly to the dampers and springs as in FIGS. 4 and 5. As a result, dampers and springs move certain compatible displacements to that of the superstructures, dissipating energy and attenuating movement accelerations and velocities, and thus softening the responses of superstructures isolated by FPS or by Mary Grace Isolators, 4. Beam that is the fourth part, 4, in FIGS. 3, 4 and 5 is usually to be made of steel and can be made of other materials. It connects the Mary Grace Damping Device to ground via dampers and springs as shown in FIG. 3 or by columns as seen in FIGS. 4 and 5. The beam function is to transfer relative vertical displacements of the superstructure to dampers and springs.

5. Dampers, that are the fifth part, 5, in FIGS. 3, 4 and 5, are attached to the Base of one side and to a superstructure in the other side as per FIGS. 4 and 5 or attached to a steel beam from one side and to ground from the other side as in FIG. 3. Dampers function is to attenuate the superstructure motions. Dampers can be viscous or any other types such as those using Magnetorheological fluid.

6. Spring is the sixth part, 6, in FIGS. 3, 4 and 5. A spring attached to the Base of one side and to the superstructure in the other side as per FIGS. 4 and 5 or attached to the steel beam from one side and ground from the other. Springs should have sufficient stiffness related to damping ratio, Earthquake and structure characteristics. The angles that might springs and dampers make with a ground (Horizon) can be right angle, 90, as illustrated in the FIGS. 3, 4 and 5. or less than 90 as it's not shown in these Figures. The inclined connection might be more advantageous in case of using the Mary Grace Damping System in combination with FPS.

I claim:

1. A seismic controller for a friction pendulum bearing isolated structure comprising:
   a) a beam having a longitudinal axis;
   b) a flat horizontal base having a perimeter and a rim extending from said perimeter toward said beam, wherein said base and said rim form a partial enclosure, said enclosure located below said beam and centrally fixed on top of a superstructure member;
   c) a plurality of steel balls located within said enclosure;
   d) a cover member having a flat horizontal top, wherein said cover is placed between and directly contacting said steel balls and said beam such that said flat horizontal top is centered under said beam;
   e) at least one spring member extending from each end of said beam to a ground;
   f) at least one damper extending from each end of said beam to said ground.

2. The seismic controller as provided in claim 1, wherein said, steel balls and said partial enclosure having smooth contacting surfaces.

3. A method of operating a seismic controller, comprising the steps of:
   a) providing a plurality of friction pendulum bearings below a superstructure, such that said friction pendulum bearings isolate said superstructure from a ground;
   b) providing a plurality of seismic controllers as defined in one of claim 1 or 2, each said respective seismic controller being connected to said superstructure and to said ground;
   c) whereby when said ground shakes by an earthquake, said shaking ground moves said beam which moves said cover which pushes said hard balls to roll, and when said isolated superstructure starts to rock over concaves of said friction pendulum bearings in response to said shaking ground, said superstructure moves up, up the concaves, wherein said superstructure pushes up said seismic controller bases, which push up said hard balls which push up said beam which pulls said springs and said dampers which then are activated starting dissipating seismic energy being transmitted to said isolated superstructure and then reducing forces and displacements transmitted to said superstructure.

4. A seismic controller for a friction pendulum bearing isolated structure comprising:
   a) a beam having a longitudinal axis connected rigidly from two ends to a ground;
   b) a flat horizontal base having a perimeter and a rim extending from said perimeter toward said beam, wherein said base and said rim form a partial enclosure, said base located below said beam;
   c) a plurality of steel balls located within said enclosure;
   d) a cover member having a flat horizontal top, wherein said cover is placed between and directly contacting said steel balls and said beam such that said flat horizontal top is centered under said beam;
   e) a plurality of spring members extending from a periphery of said base to a superstructure member such that said springs are located on two opposite sides of said periphery of said base, and at least a respective one of said springs is on each opposite side of said base;
   f) a plurality of dampers extending from said periphery of said base to said superstructure member such that said dampers are located on two opposite sides of said periphery of said base and at least a respective one of said dampers is on each opposite side of said base.

5. The seismic controller as provided in claim 4, wherein said cover, said steel balls and said partial enclosure have smooth contacting surfaces.

6. A method of operating a seismic controller, comprising the steps of:
   a) providing a plurality of friction pendulum bearings below said superstructure, such that said friction pendulum bearings isolate said superstructure from said ground;
   b) providing a plurality of seismic controllers as defined in one of claim 4 or 5; each said respective seismic controller being connected to a member of said isolated superstructure and to said ground;
   c) whereby when said ground shakes by an earthquake, said shaking ground moves said beam which moves said cover which moves said hard balls to roll, and when said isolated superstructure starts to rock over concaves of said friction pendulum bearings in response to said shaking ground, the superstructure moves up, up the concaves, wherein said superstructure pulls up the dampers and said springs which are fixed to said seismic controller base, then said springs and said dampers are reactivated starting dissipating seismic energy being transmitted to said isolated superstructure and then reducing forces and displacements transmitted to said superstructure.

7. A method of controlling and reducing response displacements and forces imparted to a seismically isolated superstructure, by a plurality of friction pendulum bearings, due to earthquakes or by winds, by providing and incorporating a plurality of seismic controllers as defined in one of claim 1, 2, 4 or 5 into said isolated superstructure wherein said seismic controllers absorb seismic energy being transmitted to said isolated superstructure and reduce the response displacements and forces of said isolated superstructure to prevent damage to said isolated superstructure due to said earthquakes.

* * * * *